(12) United States Patent
Howarth et al.

(10) Patent No.: US 10,663,753 B2
(45) Date of Patent: May 26, 2020

(54) SHAPE MEMORY ALLOY ACTUATOR ARRANGEMENT

(71) Applicant: CAMBRIDGE MECHATRONICS LIMITED, Cambridge (GB)

(72) Inventors: James Howarth, Cambridge (GB); Robin Eddington, Cambridge (GB); Nicholas Henry Reddall, Cambridge (GB)

(73) Assignee: CAMBRIDGE MECHATRONICS LIMITED, Cambridge, Cambridgeshire (GB)

( * ) Notice: Subject to any disclaimer, the term of this patent is extended or adjusted under 35 U.S.C. 154(b) by 0 days.

(21) Appl. No.: 15/763,751

(22) PCT Filed: Sep. 29, 2016

(86) PCT No.: PCT/GB2016/000174
§ 371 (c)(1),
(2) Date: Mar. 27, 2018

(87) PCT Pub. No.: WO2017/055788
PCT Pub. Date: Apr. 6, 2017

(65) Prior Publication Data
US 2018/0284475 A1    Oct. 4, 2018

(30) Foreign Application Priority Data
Sep. 29, 2015   (GB) .................................. 1517202.6

(51) Int. Cl.
*H04N 5/232*        (2006.01)
*H04N 5/205*        (2006.01)
(Continued)

(52) U.S. Cl.
CPC ........... *G02B 27/646* (2013.01); *F03G 7/065* (2013.01); *G02B 7/08* (2013.01); *G03B 5/02* (2013.01);
(Continued)

(58) Field of Classification Search
CPC ........... H04N 5/23258; H04N 5/23287; H04N 5/23248; H04N 5/2251; G02B 27/646;
(Continued)

(56) References Cited

U.S. PATENT DOCUMENTS 5,684,640 A    11/1997   Tanaka et al.
6,064,827 A    5/2000    Toyoda
(Continued)

FOREIGN PATENT DOCUMENTS

CN    202077117 U    12/2011
EP    1659435 A1    5/2006
(Continued)

OTHER PUBLICATIONS

U.S. Appl. No. 14/402,576, filed Nov. 20, 2014, Robin Eddington et al.
(Continued)

*Primary Examiner* — Marly S Camargo
(74) *Attorney, Agent, or Firm* — Harness, Dickey & Pierce, P.L.C.

(57) ABSTRACT

A shape memory alloy actuator arrangement for a movable element supporting a camera lens assembly comprises plural shape memory alloy actuator wires connected between a support structure and the movable element in an arrangement wherein the shape memory alloy actuator wires are arranged, on selective driving, to move the movable element relative to the support structure in any direction orthogonal to the optical axis of the at least one lens. At least one plain bearing bears the movable element on the support structure,
(Continued)

allowing movement of the movable element relative to the support structure orthogonal to the optical axis.

20 Claims, 4 Drawing Sheets

(51) Int. Cl.
  *G02B 27/64* (2006.01)
  *G02B 7/08* (2006.01)
  *G03B 5/02* (2006.01)
  *F03G 7/06* (2006.01)
  *G03B 3/10* (2006.01)
(52) U.S. Cl.
  CPC ........ *G03B 3/10* (2013.01); *G03B 2205/0007* (2013.01); *G03B 2205/0015* (2013.01); *G03B 2205/0076* (2013.01)
(58) Field of Classification Search
  CPC ... G02B 7/08; G03B 3/10; G03B 5/00; G03B 5/02; G03B 2205/0007; G03B 2205/0015; G03B 2205/0076; F03G 7/065
  USPC ..... 348/208.1, 208.99, 208.2, 208.4, 208.11, 348/208.13, 345, 347, 373, 340, 150, 352, 348/37, 374; 396/55, 133, 52, 72; 359/823, 557, 554, 813
  See application file for complete search history.

(56) References Cited

U.S. PATENT DOCUMENTS

| | | | |
|---|---|---|---|
| 8,073,320 B2 * | 12/2011 | Topliss | G03B 3/10 396/133 |
| 8,248,497 B2 | 8/2012 | Tanimura et al. | |
| 8,559,803 B2 | 10/2013 | Huang et al. | |
| 2001/0022688 A1 | 9/2001 | Kosaka et al. | |
| 2006/0150627 A1 | 7/2006 | Oohara | |
| 2007/0109412 A1 | 5/2007 | Hara | |
| 2008/0074744 A1 | 3/2008 | Osaka et al. | |
| 2008/0231955 A1 | 9/2008 | Otsuka | |
| 2010/0074608 A1 * | 3/2010 | Topliss | G03B 3/10 359/823 |
| 2010/0265343 A1 | 10/2010 | Lee et al. | |
| 2011/0013283 A1 | 1/2011 | Sato | |
| 2011/0179786 A1 * | 7/2011 | Topliss | F03G 7/06 60/537 |
| 2011/0292509 A1 | 12/2011 | Yasuda | |
| 2012/0251088 A1 | 10/2012 | Huang et al. | |
| 2015/0135703 A1 * | 5/2015 | Eddington | F03G 7/065 396/133 |
| 2015/0322929 A1 | 11/2015 | Morikawa et al. | |
| 2015/0365568 A1 * | 12/2015 | Topliss | H04N 5/2251 348/208.11 |
| 2016/0154250 A1 | 6/2016 | Miller | |
| 2016/0154251 A1 | 6/2016 | Ladwig et al. | |
| 2018/0149142 A1 * | 5/2018 | Bunting | F03G 7/065 29/423 |
| 2018/0306247 A1 * | 10/2018 | Plogmann | F16C 17/10 384/107 |
| 2018/0321503 A1 * | 11/2018 | Brown | F03G 7/065 359/694 |
| 2019/0309796 A1 * | 10/2019 | Haecker | F16C 33/208 384/129 |

FOREIGN PATENT DOCUMENTS

| | | |
|---|---|---|
| EP | 1659435 B1 | 5/2011 |
| KR | 20130042794 A | 4/2013 |
| KR | 20150071408 A | 6/2015 |
| WO | WO-2007/113478 A1 | 10/2007 |
| WO | WO-2010/029316 A2 | 3/2010 |
| WO | WO-2010/089529 A1 | 8/2010 |
| WO | WO-2011/104518 A1 | 9/2011 |
| WO | WO-2012/020212 A1 | 2/2012 |
| WO | WO-2012/038703 A2 | 3/2012 |
| WO | WO-2012/066285 A1 | 5/2012 |
| WO | WO-2013/118601 A1 | 8/2013 |
| WO | WO-2013/153400 A2 | 10/2013 |
| WO | WO-2013/175197 A1 | 11/2013 |
| WO | WO-2013153400 A3 | 5/2014 |
| WO | WO-2014/083318 A1 | 6/2014 |
| WO | WO-2014100516 A1 | 6/2014 |

OTHER PUBLICATIONS

U.S. Appl. No. 14/647,405, filed May 26, 2015, James Howarth et al.

Written Opinion of the International Searching Authority regarding International Application No. PCT/GB2016/000174, dated Dec. 8, 2016.

International Search Report regarding International Application No. PCT/GB2016/000174, dated Dec. 8, 2016.

* cited by examiner

SHAPE MEMORY ALLOY ACTUATOR ARRANGEMENT

CROSS-REFERENCE TO RELATED APPLICATIONS

This application is a 371 U.S. National Stage of International Application No. PCT/GB2016/000174, filed Sep. 29, 2016, which claims the benefit of Great Britain Patent Application No. 1517202.6, filed Sep. 29, 2015. The entire disclosures of the above applications are incorporated herein by reference.

In one aspect, the present invention relates to a shape memory alloy (SMA) actuator arrangement for a camera lens element that provides movement orthogonal to the optical axis. More generally, the present invention relates to a shape memory alloy (SMA) actuator arrangement for a movable element that provides movement.

In the case of a camera lens element, movement orthogonal to the optical axis may be utilised to provide optical image stabilisation (OIS) of an image focused by the camera lens element on an image sensor.

The purpose of OIS is to compensate for camera shake, that is vibration of the camera apparatus, typically caused by user hand movement, that degrades the quality of the image captured by the image sensor. OIS typically involves detecting the vibration by a vibration sensor such as a gyroscope sensor, and controlling, on the basis of the detected vibration, an actuator arrangement that adjusts the camera apparatus to compensate for the vibration. Several techniques for adjusting the camera apparatus are known. OIS by processing of a captured image is possible in principle but requires significant processing power. Accordingly, there has been developed mechanical OIS in which the optical system of the camera is adjusted mechanically.

A number of actuator arrangements employing mechanical OIS techniques are known and applied successfully in relatively large camera apparatuses, such as digital still cameras, are difficult to miniaturise. Cameras are becoming very common in a wide range of portable electronic equipment, for example mobile telephones and tablet computers, and in many such applications miniaturisation of the camera is important. The very tight packaging of components in miniature camera apparatuses presents great difficulties in adding OIS actuators within the desired package.

In one type of mechanical OIS, a camera lens element is moved orthogonal to the optical axis of the at least one lens. Such a type of OIS will be referred to herein as "OIS-shift". OIS-shift has the potential to reduce the size of the overall package for the camera as compared to a type of OIS in which a camera unit comprising an image sensor and a camera lens assembly for focussing an image on the image sensor is tilted relative to the support structure around two notional axes that are perpendicular to each other and to the optical axis of the lens assembly, for example as disclosed in WO-2010/029316 and WO-2010/089529. This is because only the camera lens element is moved and the lateral movement thereof requires less clearance than tilting the entire camera.

WO-2014/083318 discloses an SMA actuator arrangement that employs OIS-shift. In WO-2014/083318, there is employed a suspension system for suspending the camera lens element on the support structure that uses at least one ball to permit movement of the camera lens element relative to the support structure orthogonal to the optical axis but prevent movement along the optical axis. This provides good performance in operation. However, balls are difficult to handle in assembly, particularly in a miniature camera lens assembly. This has a negative impact of the manufacturing yield. Also, in practice the balls have a minimum size that limits miniaturisation of the arrangement.

It would therefore be desirable to provide an alternative method of suspension that does not suffer from these problems, but maintains the operation performance in permitting movement of the camera lens element relative to the support structure. Many types of suspension have high friction which makes them unsuitable for a camera lens element.

According to a first aspect of the present invention, there is provided a shape memory alloy actuator arrangement for a camera lens element, the shape memory alloy actuator arrangement comprising: a support structure; a movable element for supporting a camera lens assembly comprising at least one lens having an optical axis; plural shape memory alloy actuator wires connected between the support structure and the movable element in an arrangement wherein the shape memory alloy actuator wires are arranged, on selective driving, to move the movable element relative to the support structure in any direction orthogonal to the optical axis; and at least one plain bearing that bears the movable element on the support structure, allowing movement of the movable element relative to the support structure orthogonal to the optical axis.

Thus, at least one plain bearing is used to bear the camera lens element on the support structure, allowing movement of the camera lens element relative to the support structure orthogonal to the optical axis. A plain bearing is a bearing comprising two surfaces in contact with each other and permitting relative sliding motion. Of course, a plain bearing is a simple type of bearing which is known for use in other applications. Inevitably the contact provides friction which adversely affects the performance, particularly in a miniature arrangement. However, surprisingly, plain bearings can in fact be used to provide good performance in which the friction is sufficiently low to allow movement perpendicular to the optical axis. This is possible, in part, because the SMA actuator wires provide a high actuation force compared to other forms of actuator.

Furthermore, plain bearings may be formed with inherently small size along the height of the bearing, that is along the optical axis, especially compared to a suspension system employing balls. This allows the size of the arrangement to be reduced along the optical axis compared to that disclosed in WO-2014/083318.

As the present motion orthogonal to the optical axis of the at least one lens, the plain bearing may comprise conforming surfaces in contact with each other which are planar. By using a plain bearing comprising planar conforming surfaces, it is possible to avoid contact at a point or along a line. Such contact at a point or along a line may be disadvantageous, as wear would be concentrated in a small area, which could over time cause changes in the area of contact and hence the properties of the bearing. In contrast, the advantage of a plain bearing comprising planar conforming surfaces is that wear is distributed across a larger area, which area remains stable over time.

Similar problems to those described above for a camera lens element occur also in the more general case of an SMA actuator arrangement for a movable element of any other type.

Thus, according to a second aspect of the present invention, there is provided a shape memory alloy actuator arrangement, the shape memory alloy actuator arrangement comprising: a support structure; a movable element; at least one shape memory alloy actuator wire connected between the support structure and the movable element in an arrangement wherein the shape memory alloy actuator wire is arranged, on driving thereof, to move the movable element relative to the support structure; and at least one plain bearing that bears the movable element on the support structure, allowing movement of the movable element relative to the support structure.

In this more general case, the movement may be in a plane in which case the at least one plain bearing may comprise conforming surfaces that are planar, or may be rotational in which case the at least one plain bearing may comprise conforming surfaces that are cylindrical sections.

To allow better understanding, an embodiment of the present invention will now be described by way of non-limitative example with reference to the accompanying drawings, in which.

Figure 1:
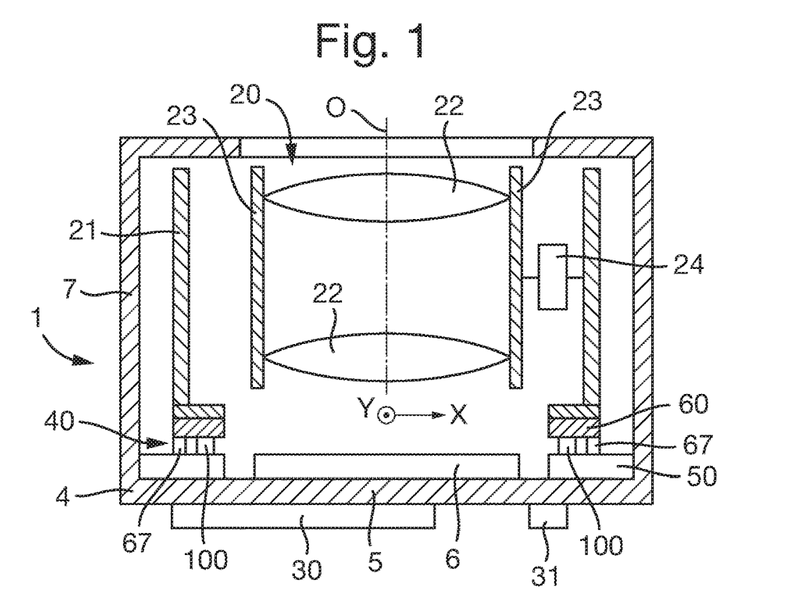
FIG. 1 is a schematic cross-sectional view of a camera apparatus including an SMA actuator arrangement.

A camera apparatus 1 that incorporates an SMA actuator arrangement 40 in accordance with the present invention is shown in FIG. 1, which is a cross-sectional view taken along the optical axis O. The camera apparatus 1 is to be incorporated in a portable electronic device such as a mobile telephone, or tablet computer. Thus, miniaturisation is an important design criterion.

The camera apparatus 1 comprises a camera lens assembly 20 suspended on a support structure 4 by an SMA actuator arrangement 40 that supports the lens assembly 20 in a manner allowing movement of the lens assembly 20 relative to the support structure 4 in two orthogonal directions each perpendicular to the optical axis O.

The support structure 4 is a camera support supporting an image sensor 6. The support structure 4 comprises a base 5, the image sensor 6 being mounted on the front side of the base 5. On the rear side of the base 5, there is mounted an IC (integrated circuit) chip 30 in which a control circuit is implemented, and also a gyroscope sensor 31. The support structure 4 also comprises a can 7 protruding forwardly from the base 5 to encase and protect the other components of the camera apparatus 1.

The camera lens assembly 20 comprises a lens carriage 21 in the form of a cylindrical body supporting two lenses 22 arranged along the optical axis O, although in general any number of one or more lenses 22 may be provided. The camera apparatus 1 is a miniature camera in which the lenses 22 (or lens 22 if a single lens is provided) have a diameter of at most 10 mm.

The lens assembly 20 is arranged to focus an image onto the image sensor 6. The image sensor 6 captures the image and may be of any suitable type, for example a CCD (charge-coupled device) or a CMOS (complimentary metal-oxide-semiconductor) device.

In this example, the lenses 22 are supported on the lens carriage 21 in a manner in which the lenses 22 are movable along the optical axis O relative to the lens carriage 21, for example to provide focussing or zoom. In particular, the lenses 22 are fixed to a lens holder 23 which is movable along the optical axis O relative to the lens carriage 21. Although all the lenses 22 are fixed to the lens holder 23 in this example, in general one or more of the lenses 22 may be fixed to the lens carriage 21 and so not movable along the optical axis O relative to the lens carriage 21, leaving at least one of the lenses 22 fixed to the lens holder 23.

An axial actuator arrangement 24 provided between the lens carriage 21 and the lens holder 23 is arranged to drive movement of the lens holder 21 and lenses 22 along the optical axis O relative to the lens carriage 21. The axial actuator arrangement 24 may be any suitable type, for example being a voice coil motor (VCM) or an arrangement of SMA actuator wires, such as is described in WO-2007/113478 which is incorporated herein by reference.

In operation, the camera lens assembly 20 is moved orthogonally to the optical axis O in two orthogonal directions, shown as X and Y, relative to the image sensor 6, with the effect that the image on the image sensor 6 is moved. This is used to provide OIS, compensating for image movement of the camera apparatus 1, caused by for example hand shake.

The SMA actuator arrangement 40 will now be described in more detail with reference to FIGS. 2 and 3, FIG. 2 being an exploded view of the SMA actuator arrangement 40 omitting the SMA actuator wires 80, and FIG. 3 being a side view of the SMA actuator arrangement 40 expanded along the optical axis O.

The SMA actuator arrangement 40 comprises a support plate 50 that forms part of the support structure 4 and is connected to the base 5. The SMA actuator arrangement 40 further comprises a moving plate 60. In this embodiment the moving plate 60 is the moving element, but it could equally form part of a movable element including other components. The moving plate 60 supports the camera lens assembly 20 and is connected to the lens carriage 21. The support plate 50 and the moving plate 60 are integral sheets made of metal, for example steel such as stainless steel.

Each of the support plate 50 and the moving plate 60 is provided with a central aperture aligned with the optical axis O allowing the passage of light from the camera lens assembly 20 to the image sensor 6.

Movement of the camera lens assembly 20 relative to the support structure 4 is driven by a lateral actuation arrangement comprising plural SMA actuator wires 80 connected between the support structure 4 and the movable element. Specifically, the support plate 50 is formed with crimps 51 and the moving plate 60 is formed with crimps 61, the crimps 51 and 61 crimping the four SMA actuator wires 80 so as to connect them to the support plate 50 and the moving plate 60. The SMA wires 80 may be perpendicular to the optical axis O or inclined at a small angle to the plane perpendicular to the optical axis O. Each of the SMA actuator wires 80 is held in tension, thereby applying a force between the support plate 50 and the moving plate 60 in a direction perpendicular to the optical axis O. In operation, the SMA actuator wires 80 are selectively driven to move the camera lens assembly 20 relative to the support structure 4 in any direction orthogonal to the optical axis O. The overall arrangement of the SMA wires 80 to achieve this is the same as described in WO-2014/083318, as follows.

SMA material has the property that on heating it undergoes a solid-state phase change which causes the SMA material to contract. At low temperatures the SMA material enters the Martensite phase. At high temperatures the SMA enters the Austenite phase which induces a deformation causing the SMA material to contract. The phase change occurs over a range of temperature due to the statistical spread of transition temperature in the SMA crystal structure. Thus heating of the SMA actuator wires 80 causes them to decrease in length.

The SMA actuator wires 80 may be made of any suitable SMA material, for example Nitinol or another Titanium-alloy SMA material. Advantageously, the material composition and pre-treatment of the SMA actuator wires 80 is chosen to provide phase change over a range of temperature that is above the expected ambient temperature during normal operation and as wide as possible to maximise the degree of positional control.

On heating of one of the SMA actuator wires 80, the stress therein increases and it contracts, causing movement of the camera lens element 20. A range of movement occurs as the temperature of the SMA increases over the range of temperature in which there occurs the transition of the SMA material from the Martensite phase to the Austenite phase. Conversely, on cooling of one of the SMA actuator wires 80 so that the stress therein decreases, it expands under the force from opposing ones of the SMA actuator wires 80. This allows the camera lens element 20 to move in the opposite direction.

The SMA actuator wires 80 have an arrangement in a loop at different angular positions around the optical axis O to provide two pairs of opposed SMA actuator wires 80 that are perpendicular to each other. Thus each pair of opposed SMA actuator wires 80 is capable on selective driving to move the camera lens element 20 in one of two perpendicular directions X and Y orthogonal to the optical axis O. As a result, the SMA actuator wires 80 are capable of being selectively driven to move the camera lens element 20 relative to the support structure 4 to any position in a range of movement in two directions orthogonal to the optical axis O. The magnitude of the range of movement depends on the geometry and the range of contraction of the SMA actuator wires 80 within their normal operating parameters.

The position of the camera lens element 20 relative to the support structure 4 perpendicular to the optical axis O is controlled by selectively varying the temperature of the SMA actuator wires 80. This is achieved by passing through SMA actuator wires 80 selective drive signals that provide resistive heating. Heating is provided directly by the drive current. Cooling is provided by reducing or ceasing the drive current to allow the SMA wire 80 to cool by conduction, convection and radiation to its surroundings.

The drive signals for the SMA actuator wires 80 are generated and supplied by the control circuit implemented in the IC chip 30.

The control circuit uses the output signals of the gyroscope sensor 31 which is a vibration sensor. The gyroscope sensor 31 detects the vibrations that the camera apparatus 1 is experiencing and its output signals represent the angular velocity of the camera lens element 20. The gyroscope sensor 31 is typically a pair of miniature gyroscopes, for detecting vibration around two axes perpendicular to each other and the optical axis O, although in general larger numbers of gyroscopes or other types of vibration sensor could be used.

The drive signals are generated by the control circuit in response to the output signals of the gyroscope sensor 31 so as to drive movement of the camera lens element 20 to stabilise an image focused by the camera lens element 20 on the image sensor 6, thereby providing OIS. The drive signals may be generated using a resistance feedback control technique for example as disclosed in any of International Patent Application No. PCT/GB2013/051325; International Patent Application No. PCT/GB2013/052959; WO-2012/066285; WO-2012/020212; WO-2011/104518; WO-2012/038703; WO-2010/089529 or WO-2010029316, each of which is incorporated herein by reference.

In addition, the SMA actuator arrangement 40 comprises three plain bearings 100 spaced around the optical axis O to bear the moving plate 60 on the support plate 50. Each plain bearing 100 is arranged as follows and as illustrated in more detail in FIG. 4.

Figure 4:
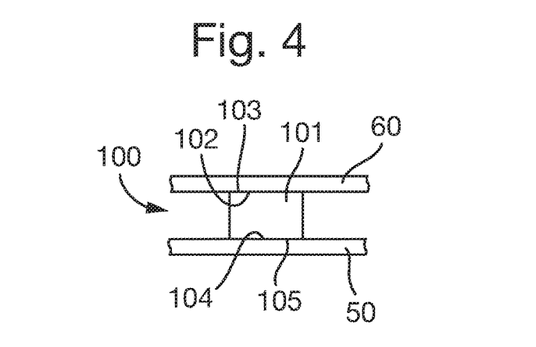
FIG. 4 is a cross-sectional view of a plain bearing of the SMA actuator arrangement.

Each plain bearing 100 comprises a bearing member 101. The bearing member 101 separates the moving plate 60 and the support plate 50, and the thickness of the bearing members 101 is chosen accordingly. Due to the simplicity of the bearing members 101, it possible to minimise the separation and hence the height of the SMA actuator arrangement 40 along the optical axis O.

In one alternative, the bearing member 101 is fixed to the support plate 50, for example by adhesive. In this case, the bearing member 101 also bears on the moving plate 60. That is, a surface 102 of the bearing member 101 on the opposite side from the support plate 50 and a surface 103 of the moving plate 60 are planar, conforming surfaces which contact one another.

In another alternative, the bearing member 101 is fixed to the moving plate 60, for example by adhesive. In this case, the bearing member 101 also bears on the support plate 50. That is, a surface 104 of the bearing member 101 on the opposite side from the moving plate 60 and a surface 105 of the support plate 50 are planar, conforming surfaces which contact one another.

Thus, the contact between the conforming surfaces 102 and 103 or between the conforming surfaces 104 and 105 supports and bears the movable plate 60 on the support plate 50, allowing relative motion parallel to their extent, that is perpendicular to the optical axis O.

The material properties of the conforming surfaces 102 and 103 or the conforming surfaces 104 and 105 are chosen to provide a low friction and low wear plain bearing. One option is that the conforming surface 102 or 104 of the bearing member 101 is coated by a material having suitable properties. Another option is that the conforming surface 102 or 104 of the bearing member 101 is not coated, but instead the material of the bearing member 101 is chosen to have suitable properties. With either option, the other conforming surface 103 or 105 may also be coated with a material having suitable properties, but that is not essential. Where coatings are used, the coating has lower friction and/or lower wear than the material which is coated. The bearing member 101 or the coating, where used, may be made from a polymer, for example nylon, polytetrafluoroethylene (PTFE) (e.g. Teflon), an acetal (e.g. Delrin) or an Ultra High Molecular Weight Polyethylene (UHMWPE).

Figure 2:
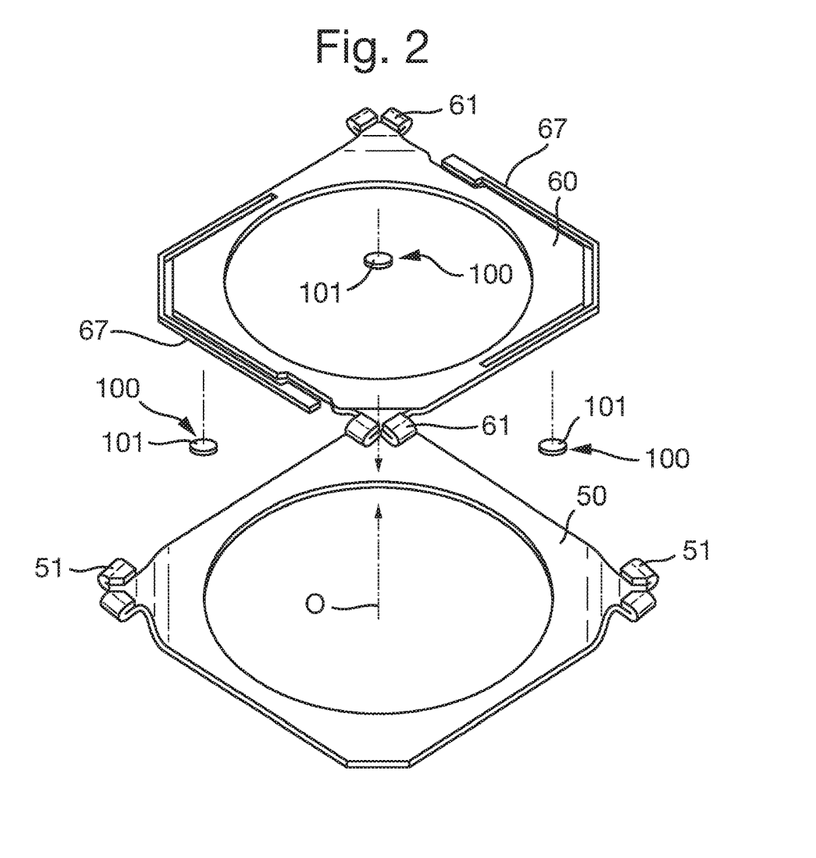
FIG. 2 is an exploded perspective view of the SMA actuator arrangement.
Figure 3:
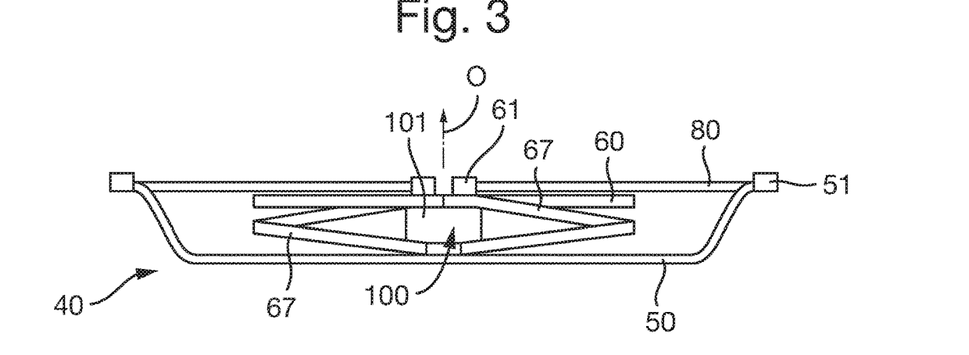
FIG. 3 is a side view of the SMA actuator arrangement.

Although FIG. 2 illustrates an example having three bearing members 101, in general there may be any number of one or more bearing members 101. Inclusion of at least three bearing members 101 spaced around the optical axis O assists in providing stable support and many practical embodiments include three or four bearing members 101.

The total area of contact of the bearing member 101, that is the area of the conforming surfaces 102 or 104 of the bearing member 101 summed over all bearing members present, is chosen to control the friction in the bearing.

Surprisingly, the plain bearings 10 can in fact provide good performance with friction that is sufficiently low to allow movement perpendicular to the optical axis O, having regard to the force applied by the SMA actuator wires. Typically, in order to limit the friction, the total area of contact is at most 3 mm², preferably at most 1.5 mm².

Equally, the plain bearings maintain a relatively high total area of contact, due to the contact over the conforming surfaces, compared to a bearing having a point or line contact. This reduces the impact of wear occurring over time and changing the area of contact and hence the bearing properties. Typically, the total area of contact is at least 0.1 mm², preferably at least 0.2 mm².

In addition, the SMA actuator assembly 40 comprises two flexures 67 connected between the support structure and the movable element to act as a biasing arrangement that biases the support structure and the movable element against each other whilst permitting the movement of the movable element relative to the support structure orthogonal to the optical axis O. The flexures 67 are arranged as follows.

The flexures 67 each extend between the support plate 50 and the movable plate 60. The flexures 67 have a dual purpose of providing a mechanical function as described below and providing electrical connections from the support structure 4 to the camera lens assembly 20.

In this example, the flexures 67 are formed integrally with the movable plate 60 at one end thereof and are mounted to the support plate 50 at the other end thereof. Alternatively, the flexures 67 could be formed integrally with the support plate 50 and are mounted to the movable plate 60, or else could be separate elements mounted to each of the support plate 50 and the movable plate 60. The mounting of the flexures 67 may be achieved by soldering which provides both mechanical and electrical connection.

The flexures 67 are arranged as follows to provide their mechanical function. Each flexure 67 is an elongate beam connected between the support structure 4 and the camera lens assembly 20.

The flexures 67, due to their intrinsic resilience, bias the support structure 4 and the camera lens element 20 together, the biasing force being applied parallel to the optical axis O. This maintains the contact in the plain bearings 100. At the same time, the flexures 67 may be laterally deflected to permit said movement of the camera lens assembly 20 relative to the support structure 4 orthogonal to the optical axis O, to permit an OIS function.

The flexures 67, again due to their intrinsic resilience, provide a lateral biasing force that biases the camera lens assembly 20 towards a central position from any direction around the central position in which the optical axis O of the camera lens assembly is aligned with the centre of the light-sensitive region of the image sensor 6. As a result, in the absence of driving of the lateral movement of the camera lens assembly 20, the camera lens assembly 20 will tend towards the central position from any direction around the central position. This ensures that the camera apparatus 1 remains functional to capture images, even in the absence of driving of the SMA actuator wires 80.

The flexures 67 are designed as follows to provide a suitable retaining force along the optical axis O for the plain bearings 101, and also to permit lateral movement with a lateral biasing force. The magnitude of the lateral biasing force is kept low enough as not to hinder OIS, whilst being high enough to centre the camera lens assembly 20 in the absence of driving.

Each flexure 67 has a cross-section with an average width orthogonal to the optical axis O is that is greater than its average thickness parallel to the optical axis O. Each flexure 67 extends in an L-shape around the optical axis O, it in general being desirable that the angular extent is at least 90° as measured between the ends of the flexure 67.

Figure 5:
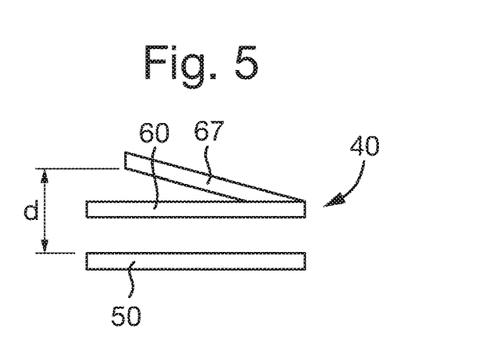
FIGS. 5 and 6 are side views of flexures of the SMA actuator arrangement in their relaxed and assembled states.
Figure 6:
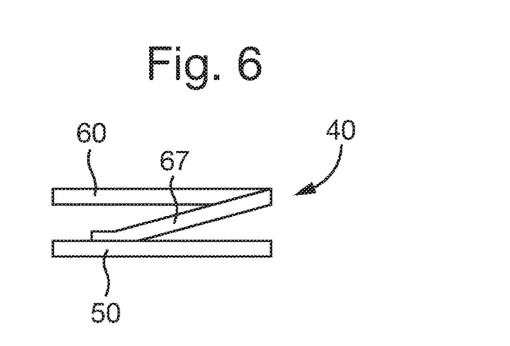

In the assembled state of the SMA actuator assembly 40, the flexures 67 are deflected from their relaxed state to provide a pre-loading force that biases the support structure 4 and the movable element together. This is illustrated in FIGS. 5 and 6, wherein FIG. 5 shows the flexures 67 in their relaxed state and FIG. 6 shows the flexures 57 in their assembled state where the flexures are deflected from their relaxed state by a distance d.

The flexures 67 are made of a suitable material that provides the desired mechanical properties and is electrically conductive. Typically the material is a metal having a relatively high yield, for example steel such as stainless steel.

The SMA actuator arrangement 40 shown in FIG. 2 employs a particular configuration of plain bearings 100 as an example, but plain bearings may be applied in a any other suitable configuration. By way of non-limitative example, some alternative configurations of plain bearings will now be described. Such alternative configurations of plain bearings may be applied as alternatives to the plain bearings 100, but with the SMA actuator arrangement 40 being otherwise as described above.

Figure 7:
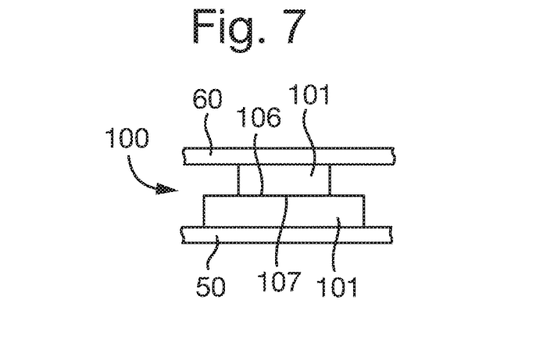
FIG. 7 is a cross-sectional view of an alternative arrangement of plain bearing.

In FIG. 2, the bearing member 101 is fixed to one of the support plate 50 and the moving plate 60, and the other of the support plate 50 and the moving plate 60 provide a conforming surface which contacts the conforming surface of the bearing member 101. FIG. 7 illustrates an alternative in which the plain bearing 100 comprises bearing members 101 fixed to both of the support plate 50 and the moving plate 60. In this case, the bearing members 101 provide conforming surfaces 106 and 107 which contact one another.

Figure 8:
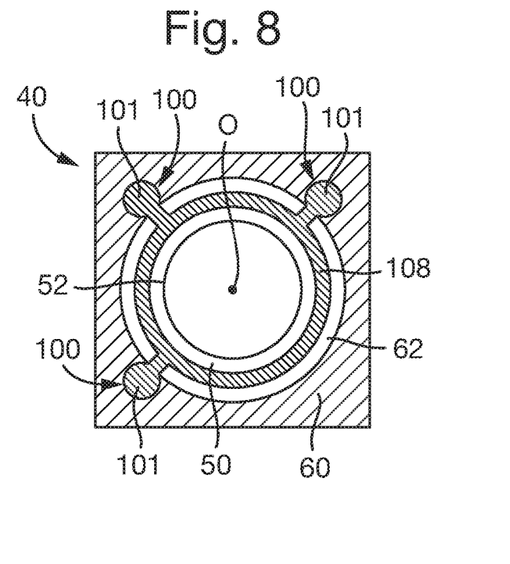
FIGS. 8 and 9 are plan views of alternative arrangements of plain bearings.

In FIG. 2, the bearing members 101 are separate elements. FIG. 8 illustrates in plan view an alternative in which the bearing members 101 are integrally formed with an annular ring 108 of the same material. In this example, the bearing members 101 and the annular ring 108 are fixed to the support plate 50 (but the arrangement could be reversed so that the annular ring 108 is fixed to the movable plate 60). The annular ring 108 extends around the optical axis O outside the aperture 52 in the support plate 50 but inside the aperture 62 in the moving plate 60, so that the annular ring 108 does not contact the moving plate 60. The bearing members 101 protrude outwardly of the annular ring 108 beyond the aperture 61 so that they overlap and bear on the moving plate 60. This arrangement provides an advantage in manufacture that the annular ring 108 and bearing members 101 may be formed as an integral element at the same time, which facilitates manufacture and improves yield.

Figure 9:
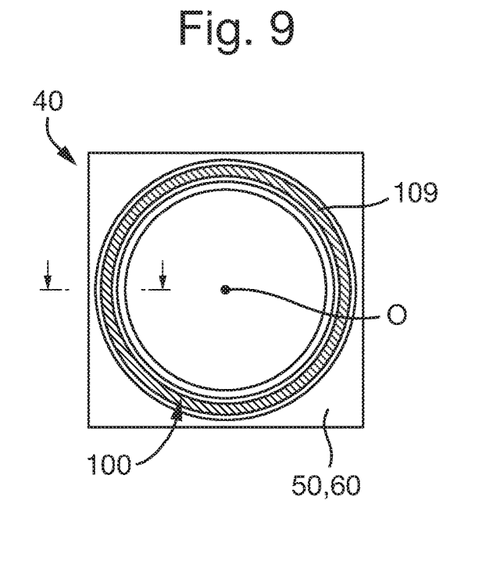

As an alternative to providing plural plain bearings 100 spaced around the optical axis O, it is possible to use a single plain bearing that is an annular bearing extending around the optical axis O. By way of example, FIG. 9 illustrates in plan view a single plain bearing 100 that is modified to be annular. The plain bearing 100 comprises an annular bearing member 109 fixed to one of the support plate 50 and the movable plate 60 and bears on the other of the support plate 50 and the movable plate 60 (although for clarity the other of the support plate 50 and the movable plate 60 is not shown in FIG. 9). Such an arrangement provides a stable support. The annular plain bearing 100 is formed as a single annular member, which facilitates manufacture and improves yield.

A potential risk with a plain bearing is that wear particles may be formed by wear of the plain bearing and that such wear particles may obscure the image capture or create mechanical or electrical problems within the SMA actuator assembly 40. It is therefore desirable to provide means for containing wear particles formed at the plain bearing. A variety of such means are possible. There will now be described some non-limitative examples of means for containing wear particles that may be applied to any of the plain bearings 100 described above.

Figure 10:
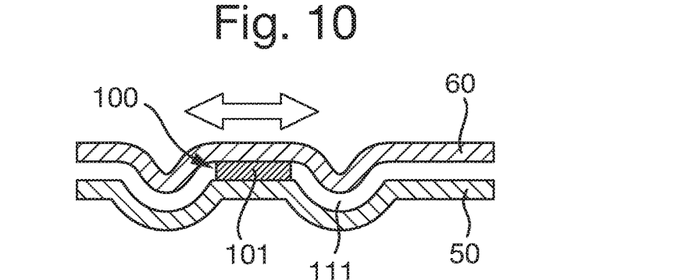
FIGS. 10 to 14 are cross-sectional views of further alternative arrangements of plain bearings.

FIG. 10 illustrates in cross-section a plain bearing 100 comprising a labyrinth path 111 as a means for containing wear particles. The labyrinth path 111 is formed between the support plate 50 and the movable plate 60, by shaping those components.

Figure 11:
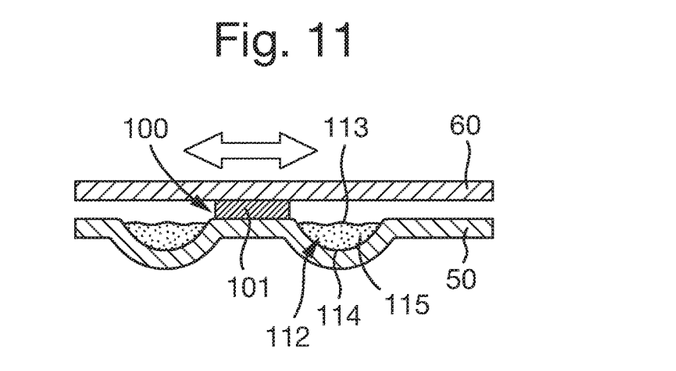

FIG. 11 illustrates in cross-section a plain bearing 100 comprising a trap 112 comprising an adherent surface 113 as a means for containing wear particles. The trap 112 is formed in a recess 114 in the support plate 50, but could be formed additionally or instead on the movable plate 60. The recess 113 contains a material 115 providing the adherent surface 113. The material 115 is chosen to be adherent to the wear particles. For example, the material may be silicone or an adhesive.

Figure 12:
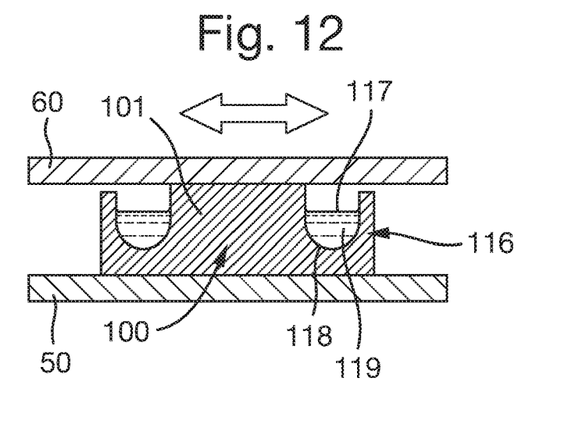

FIG. 12 illustrates in cross-section another plain bearing 100 comprising a trap 116 comprising an adherent surface 117 as a means for containing wear particles. However, in this case the trap 116 is formed in a recess 118 in the bearing member 101 of the plain bearing 100. Again, the recess 118 contains a material 119 providing the adherent surface 117. The material 119 is chosen to be adherent to the wear particles. For example, the material may be silicone or an adhesive.

Figure 13:
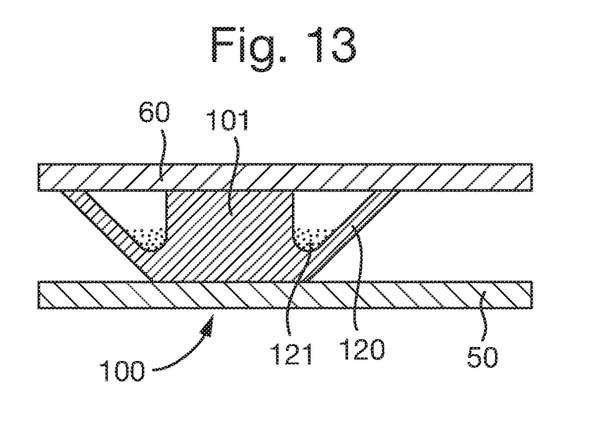

FIG. 13 illustrates in cross-section a plain bearing 100 comprising a wiper portion 120 as a means for containing wear particles. The wiper portion 120 is formed in the member 101 of the plain bearing 100. In this example, the bearing member 101 is fixed to the support plate 50 and the wiper portion 120 extends to the surface of the movable element 60, but this could be reversed. The wiper portion 120 wipes the movable element and collects wear particles 121.

The arrangements of FIGS. 12 and 13 are effective in containing wear particles, although the structures do require sufficient height and so may increase the overall height of the SMA actuator assembly along the optical axis O, albeit to a lesser extent than a suspension system employing balls.

Figure 14:
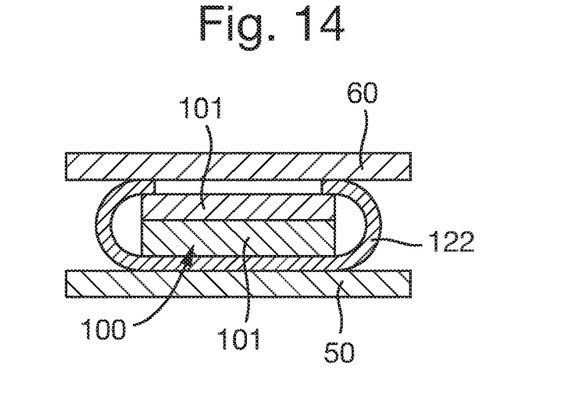

FIG. 14 illustrates in cross-section a plain bearing 100 having a diaphragm 122 that contains the plain bearing 100 as a means for containing wear particles. In this case, the plain bearing 100 comprises bearing members 101 fixed to both of the support plate 50 and the moving plate 60, so that the bearing members 101 provide conforming surfaces 106 and 107 which contact one another, similar to the arrangement shown in FIG. 7. However, in addition, the diaphragm 122 extends around the bearing members 101, thereby containing the plain bearing 100. The diaphragm 122 may be made of any suitable material, for example polyimide.

The invention claimed is:

1. A shape memory alloy actuator arrangement for a camera lens assembly, the shape memory alloy actuator arrangement comprising:
a support structure;
a movable element for supporting a camera lens assembly comprising at least one lens having an optical axis;
plural shape memory alloy actuator wires connected between the support structure and the movable element in an arrangement wherein the shape memory alloy actuator wires are arranged, on selective driving, to move the movable element relative to the support structure in any direction orthogonal to the optical axis; and
at least one plain bearing that bears the movable element on the support structure, allowing movement of the movable element relative to the support structure orthogonal to the optical axis.

2. The shape memory alloy actuator arrangement according to claim 1, wherein the at least one plain bearing comprises conforming surfaces in contact with each other which are planar.

3. The shape memory alloy actuator arrangement according to claim 1, wherein the support structure includes a support plate formed from sheet material, and the movable element includes a moving plate formed from sheet material, the plain bearing being provided between the support plate and the moving plate.

4. The shape memory alloy actuator arrangement according to claim 3, wherein the at least one plain bearing comprises conforming surfaces in contact with each other which are planar.

5. The shape memory alloy actuator arrangement according to claim 3, wherein the support plate and moving plate are each shaped with crimps crimping the shape memory alloy actuator wires.

6. The shape memory alloy actuator arrangement according to claim 4, wherein the plain bearing includes a bearing member fixed to one of the support plate and the moving plate, one of the conforming surfaces of the plain bearing being a surface of the bearing member.

7. The shape memory alloy actuator arrangement according to claim 4, wherein at least one of the conforming surfaces has a coating having lower friction and/or lower wear than the material of the conforming surface which is coated.

8. The shape memory alloy actuator arrangement according to claim 6, wherein:
the other of the conforming surfaces of the plain bearing is a surface of the other of the support plate and the moving plate; and/or
the plain bearing includes bearing members fixed to both of the support plate and the moving plate, the conforming surfaces of the plain bearing being a surface of each bearing member.

9. The shape memory alloy actuator arrangement according to claim 6, wherein the or each bearing member is made of a polymer.

10. The shape memory alloy actuator arrangement according to claim 1, further comprising a biasing arrangement connected between the support structure and the movable element that biases the support structure and the movable element against each other whilst permitting said movement of the movable element relative to the support structure orthogonal to the optical axis, preferably wherein the biasing arrangement is arranged to provide a lateral biasing force that biases the movable element towards a central position from any direction around the central position.

11. The shape memory alloy actuator arrangement according to claim 10, wherein the biasing arrangement comprises at least one flexure.

12. The shape memory alloy actuator arrangement according to claim 11, wherein:
the support structure includes a support plate formed from sheet material, and the movable element includes a moving plate formed from sheet material and the at least one flexure is integrally formed with one of the support plate and the moving plate; and/or the at least one flexure is deflected from its relaxed state so that it provides a pre-loading force that biases the support structure and the movable element together.

13. The shape memory alloy actuator arrangement according to claim 1, wherein the plain bearing further comprises means for containing wear particles formed at the plain bearing, preferably wherein the means for containing wear particles comprises one of: a labyrinth path formed between the support structure and the movable element; a trap comprising an adherent surface; a wiper portion; or a diaphragm containing the plain bearing.

14. The shape memory alloy actuator arrangement according to claim 1, wherein the at least one plain bearing is plural plain bearings.

15. The shape memory alloy actuator arrangement according to claim 1, wherein the at least one plain bearing is a single annular bearing extending around the optical axis.

16. The shape memory alloy actuator arrangement according to claim 1, wherein the at least one lens has a diameter of at most 10 mm.

17. The shape memory alloy actuator arrangement according to claim 1, further comprising a camera lens assembly comprising at least one lens, the camera lens assembly being supported on the movable element, and preferably further comprising an image sensor mounted on the support structure, the camera lens assembly being arranged to focus an image on the image sensor.

18. The shape memory alloy actuator arrangement according to claim 1, further comprising a control circuit for generating drive signals for the shape memory alloy wires, and a vibration sensor arranged to generate output signals representative of the vibration of the system, the control circuit being arranged to generate drive signals for the shape memory alloy actuator wires in response to the output signals of the vibration sensor for driving the movement of the movable element to stabilise an image focused by the movable element.

19. A shape memory alloy actuator arrangement, the shape memory alloy actuator arrangement comprising:
   a support structure;
   a movable element;
   at least one shape memory alloy actuator wire connected between the support structure and the movable element in an arrangement wherein the shape memory alloy actuator wire is arranged, on driving thereof, to move the movable element relative to the support structure; and
   at least one plain bearing that bears the movable element on the support structure, allowing movement of the movable element relative to the support structure.

20. The shape memory alloy actuator arrangement according to claim 19, wherein the at least one plain bearing comprises conforming surfaces in contact with each other which are planar.

* * * * *